United States Patent [19]

Bonomo et al.

[11] 4,213,332
[45] Jul. 22, 1980

[54] ROTOR-STATOR CONFIGURATION FOR WATER BRAKE DYNAMOMETER

[75] Inventors: Melvin E. Bonomo, Bloomington; Kenneth M. Coldren, Colfax; Verne O. Lemke, Gibson City; Loren L. Rathbun, Colfax, all of Ill.; Ronald D. Towner, Tucson, Ariz.

[73] Assignee: M & W Gear Company, Gibson City, Ill.

[21] Appl. No.: 3,587

[22] Filed: Jan. 15, 1979

[51] Int. Cl.² .............................................. G01L 5/00
[52] U.S. Cl. ..................................................... 73/134
[58] Field of Search ....................... 73/134; 192/58 A; 74/730

[56] References Cited

U.S. PATENT DOCUMENTS

| 2,672,953 | 3/1954 | Cline | 73/134 X |
| 2,981,099 | 4/1961 | Lapp | 73/134 |

Primary Examiner—Jerry W. Myracle
Attorney, Agent, or Firm—Allegretti, Newitt, Witcoff & McAndrews

[57] ABSTRACT

A water brake dynamometer includes a water brake having a stator housing with a rotor disc mounted on a through shaft. Water is pumped into the interior of the housing as the shaft and rotor are driven by an external engine. Momentum interaction transfers force between the rotor and stator housing. The planar surfaces of the opposing surfaces of the rotor housing are substantially identical as are those of the stator. A measuring device has been provided to measure the torque transferred from the rotor to the stator housing.

8 Claims, 4 Drawing Figures

ROTOR-STATOR CONFIGURATION FOR WATER BRAKE DYNAMOMETER

BACKGROUND OF THE INVENTION

In a principal aspect, the present invention relates to an improved water brake dynamometer and, more particularly, to a water brake dynamometer having an improved water brake with a new configuration for a rotor and cooperating stator.

Heretofore it has been known that dynamometers, including water brake dynamometers, provide an accurate and economical way to test engines. Torque and speed of an engine are measured accurately and precisely by such devices in order to provide a means for adjusting the engine to maximum power.

In the agricultural field, various types of dynamometers have been suggested including that disclosed in the patent to Ellsworth W. Lapp, U.S. Pat. No. 2,981,099. Known dynamometers have proven to be very useful and efficient. However, the advent of improved and more powerful engines for agricultural use necessitates an improved, wide range, heavy duty dynamometer.

A type of dynamometer believed to be adaptable for agricultural use is a water brake dynamometer. Such dynamometers are generally disclosed in The Society of Automotive Engineers Publication No. 710215 dated Jan. 11-15, 1971 entitled "High Speed Dynamometers—Modern Water Brakes Offer New Potential For Testing Engineers" by W. C. Bronder and Charles S. Jewitt. Dynamometers of this general nature are also disclosed in the patent to Taylor, U.S. Pat. No. 2,035,576 entitled "Dynamometer", issued Mar. 31, 1936, and the patent to Cline, U.S. Pat. No. 2,634,830 entitled "Apparatus and Method for Controlling Dynamometers", issued Apr. 14, 1953.

U.S. Pat. No. 2,035,576 and U.S. Pat. No. 2,634,830 disclose momentum interaction dynamometers wherein torque is transferred between a rotor and a stator element by means of directed fluid flow between sectors of the rotor and the stator. In the patent issued to Cline, momentum interaction or fluid transfer is effected by means of blade members associated with a rotor directing fluid against cooperative blade members associated with a stator. In the Taylor patent, the rotor and stator are comprised of flat discs having surfaces in opposed relation. Variously sized pie-shaped segments are formed in the surface of each disc. Momentum interaction is effected by transfer of fluid between the pie-shaped segment of a rotor and a separate pie-shaped segment of a stator or vice versa upon rotation of the rotor with respect to the stator.

While the particular rotor and stator configurations disclosed in these references are believed to perform in an acceptable manner, a distinctive and improved rotor and stator design for momentum transfer is deemed desirable. The present invention relates to a pattern or configuration of rotor and stator surfaces which is believed to provide improved results and which is clearly unique in construction with respect to the known prior art.

SUMMARY OF THE INVENTION

Briefly, the present invention relates to the configuration of a rotor and stator associated with the water brake of a water brake dynamometer. The dynamometer includes a stator housing, a rotor mounted on a shaft within the stator housing, means for circulating fluid through the stator housing and means for sensing torque imparted by movement of the rotor within the stator housing. The improved configuration associated with the rotor and the stator housing comprises a pattern of identical depressions formed in the opposed planar surfaces of the stator disc. Likewise the opposed surfaces of the interior of the rotor housing are identical. The pattern of depressions is defined by equispaced radially extending walls interconnected by a series of concentric, circumferential walls. Slits are provided in the circumferential walls connecting certain selected depressions defined in each surface. The number of radial walls associated with the rotor housing differs from the number associated with the stator.

Additionally, selected slots and grooves are provided in the rim of the rotor and cooperate with slots associated with the stator housing surrounding the rotor.

Thus, it is an object of the present invention to provide an improved water brake dynamometer including a water brake having a rotor and stator housing with opposing surfaces that have a unique configuration or pattern for momentum interaction of fluid between the rotor and stator housing.

A further object of the present invention is to provide a water brake dynamometer having an improved water brake with a rotor and stator housing having surfaces with patterns that have identical concentric walls and non-identical radial walls.

A further object of the present invention is to provide an improved water brake dynamometer and, more particularly, a dynamometer having a rotor and stator configuration which provides reliable, accurate and easily controlled momentum transfer of torque force from the rotor to the stator housing.

A further object of the present invention is to provide a water brake dynamometer which is easy to manufacture, service and repair with respect to the rotor and stator housing.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
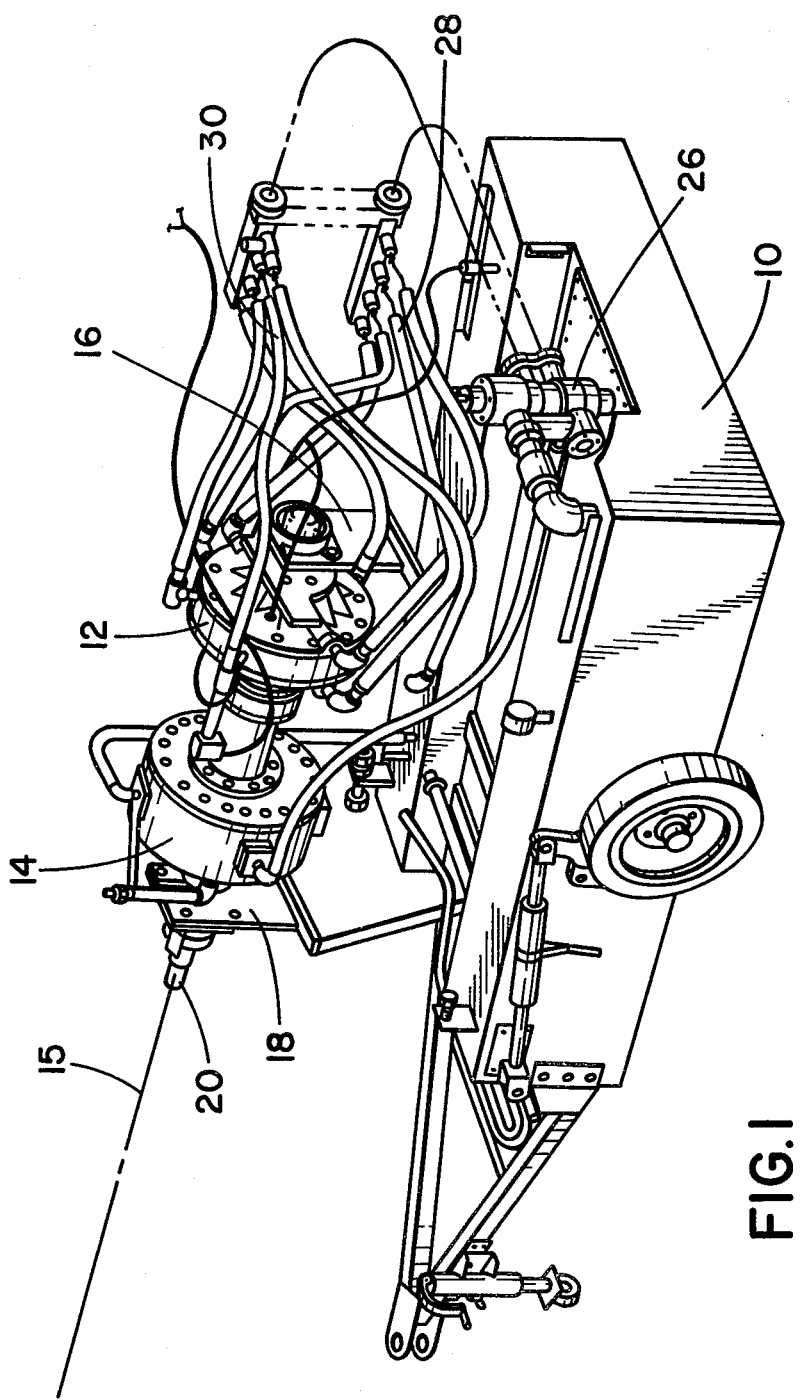
FIG. 1 is a partially exploded perspective view of a water brake dynamometer including the improvement of the present invention.
Figure 2:
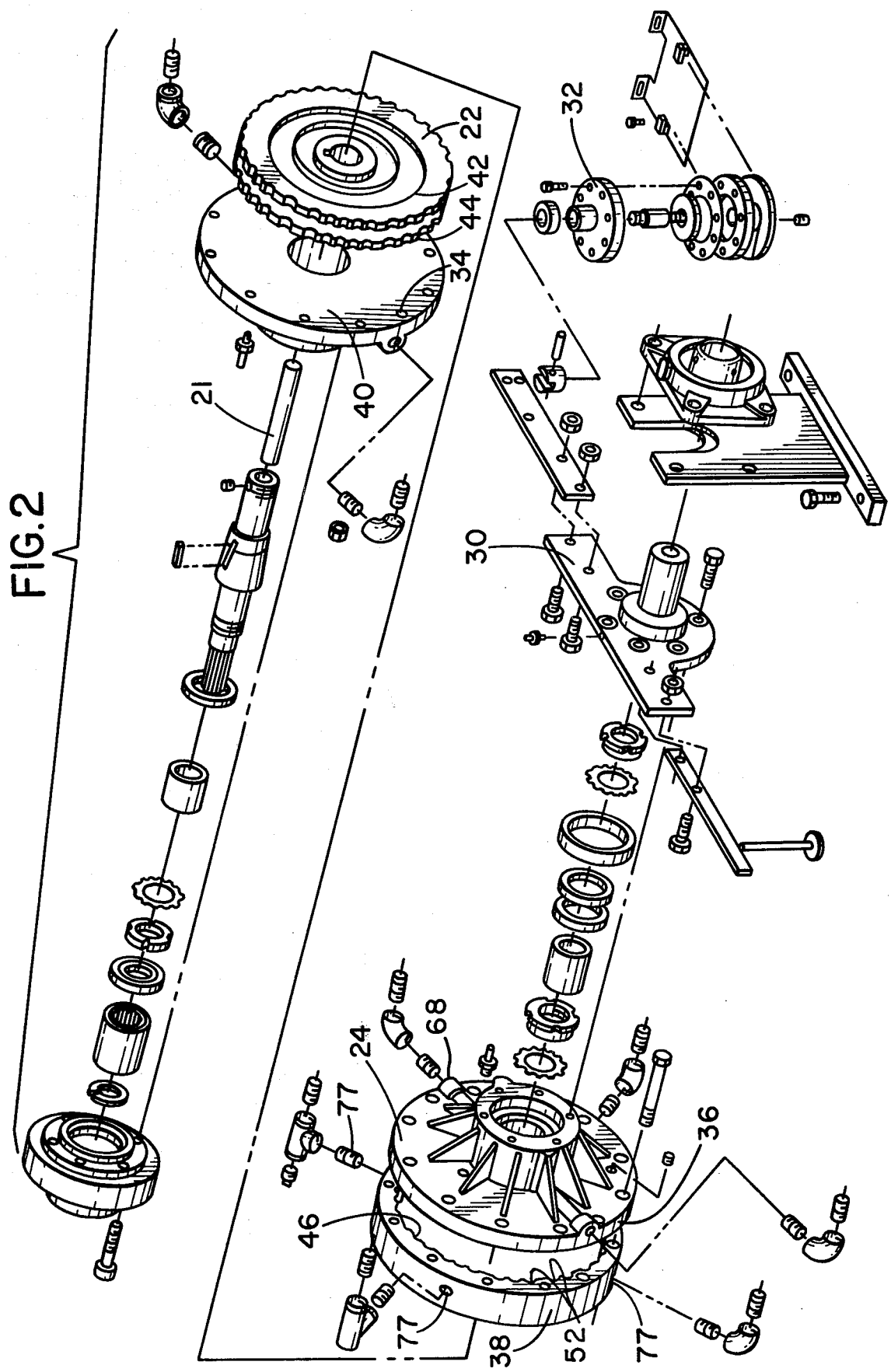
FIG. 2 is an exploded perspective view of the water brake including the improved rotor and stator configuration of the present invention.

Referring, therefore, to FIG. 1, the water brake dynamometer of the present invention includes a water reservoir 10 which is mounted on a running gear to provide for mobility of the dynamometer. A water brake 12 and connected gear box 14 are pivotally mounted on brackets 16 and 18 fixed on the reservoir platform so as to pivot in unison about an axis of rotation 15 defined by the brackets 16, 18. An input shaft 20 to the gear box 14 is provided for connection with a power take off or drift shaft from the engine to be tested. Output shaft 21 from the gear box 14 passes through the water brake 12 and drives a rotor 22 within a stator housing 24. Shaft 21 is thus keyed to the rotor 22.

Water is delivered from the reservoir 10 by means of a pump (not shown) within the reservoir 10 and directed through a manifold valve assembly 26 and water inlet tubes 28 to the stator housing 12. Water return tubes 30 lead from the stator housing 24 back through the valve assembly 26 and into the reservoir 10. The pump (not shown) and valve assembly 26 provide a constant volume of water at constant pressure to the stator housing 24.

A lever arm assembly 30 is attached to the stator housing 24. Torque transmitted from the rotor 22 to the stator housing 24 is directed by the lever arm assembly 30 into a sensing assembly 32. Signals detected by sensor assembly 32 are used to calculate torque. Another sensor (not shown) detects the input revolutions per minute (r.p.m.) to the shafts 20 and 21. These measurements (torque and r.p.m.) can then be utilized to calculate the power delivered by the engine through the shafts 20 and 21.

The present invention relates specifically to the configuration of the disc forming the rotor 22 and the interior of the stator housing 24. Thus, the stator housing 24 is formed by opposed stator plates 34 and 36 separated by an annular ring 38. The plate 34, as well as the plate 36, each define a generally planar, momentum interaction surface 40 which is in opposed relation with a momentum interaction surface 42 of rotor 22. The surfaces 40 and 42 are all generally planar, in opposed relation and transverse to the axis of shaft 21, i.e., the axis of rotation of the rotor 22.

The rotor 22 thus comprises a disc member having opposed planar surfaces 42 and a circumferential, cylindrical surface 44. The cylindrical surface 44 is opposed by the inner circumferential surface 46 of the annular ring 38. The rim or edge of the rotor 22 defining surface 44 includes a circumferential groove 48 and a plurality of transverse equispaced slots 50 about the circumference of the rim. Slots 50 are parallel to the shaft 21 or axis of the rotor 22. The slots 50 are in opposed relation with equispaced slots 52 on the inside surface of the annular ring 38 of housing 24.

Figure 3:
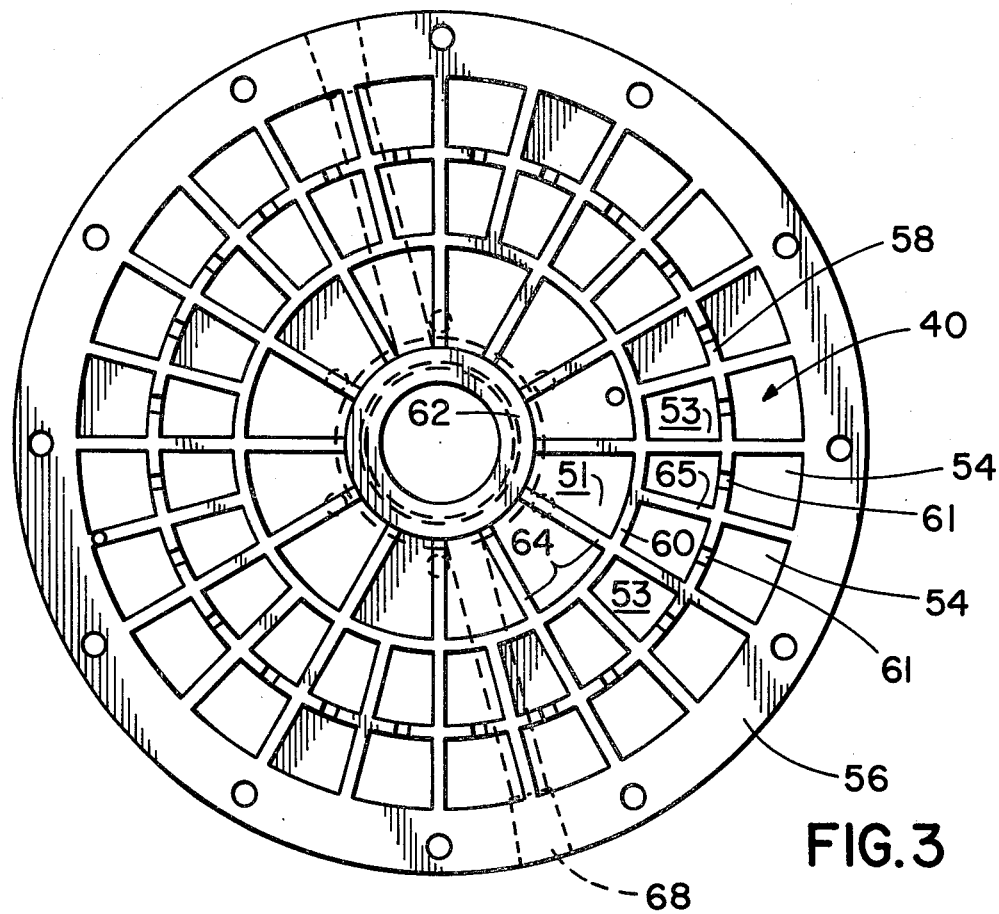
FIG. 3 is a plan view of the stator housing associated with the water brake of the present invention.
Figure 4:
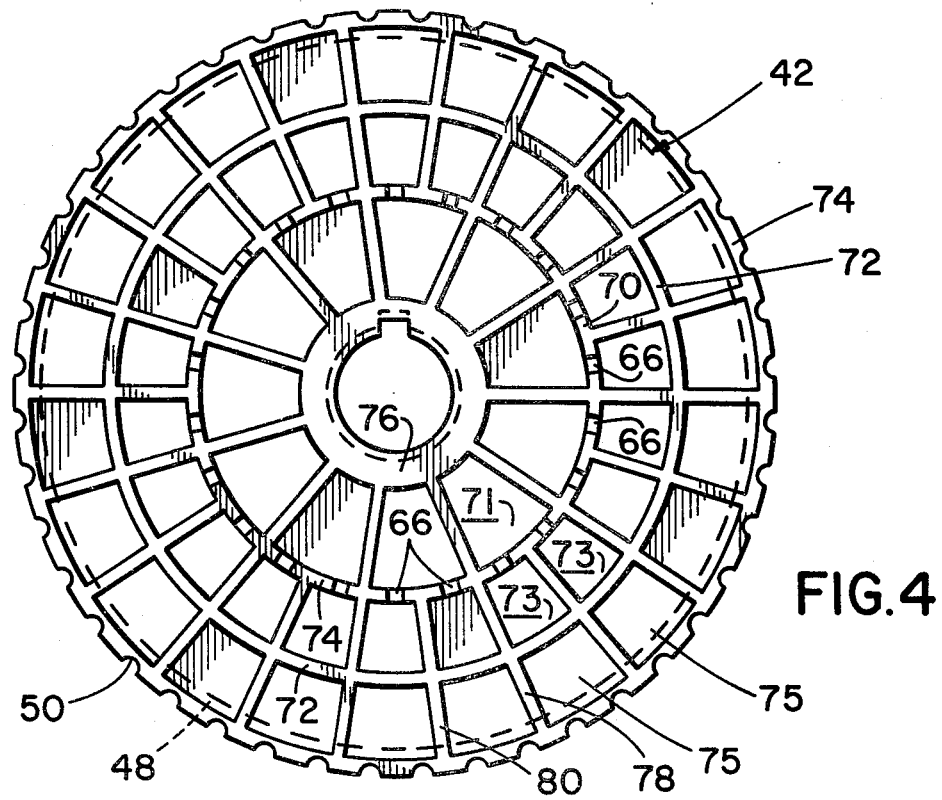
FIG. 4 is a plan view of the rotor associated with the stator housing of the water brake dynamometer of the present invention.

Referring, therefore, to FIGS. 3 and 4, the configuration of the stator surfaces 40 and rotor surfaces 42, as well as the configuration of the groove 48, slots 50 and 52 are shown in greater detail. The surface pattern of each of the stator momentum interaction surfaces 40 is substantially identical as illustrated in FIG. 3. Likewise the surface pattern of each of the rotor momentum interaction surfaces 42 is substantially identical as shown in FIG. 4. Each stator surface 40 includes a plurality of depressions 51, 53, 54 which are defined by a pattern of radial and concentric, circumferential walls coplanar with the surface 40. Thus, referring to FIG. 3, the stator surface 40 includes an outer edge or concentric circumferential wall 56, a second concentric, circumferential wall 58 of lesser diameter and a third concentric, circumferential wall 60 of even lesser diameter. The walls 56, 58 and 60 are concentric about axis 15. They are formed about a hub 62 which also has as its center the axis 15 of rotation of shaft 21 keyed to the rotor 22.

Twelve equispaced radial walls 64 extend from the hub 62 to the outer circumferential wall 56. Walls 64, hub 62 and wall 60 thus define twelve pie-shaped depressions 51. Intermediate, equispaced radial walls 65 extend between the second or inside circular wall 60 and the outer wall 56 to define shaped depressions 53 and 54. Radial slits 61 in the intermediate circumferential wall 58 connect depressions 53 and 54.

A water inlet passage 68 is defined in the stator housing 24 for introduction of water at the hub 62 into the various depressions 51 associated with the hub 62. Typically, an inlet passage 68 is provided on opposite sides of the stator housing 24 and hub 62.

The ring 38 is affixed to the stator housing 24 in FIG. 3 so as to position the ring 38 and more particularly the slots 52 in opposed relation with the slots 50 of the rotor 22 when the rotor 22 is assembled with the stator housing 24.

FIG. 4 illustrates the surface configuration associated with the surfaces 42 of the rotor 22. It will be noted that the surface formation of the rotor 22 is similar to that of the stator housing 24. Concentric, circumferential rings or walls 70, 72 and 74 correspond to walls 60, 58 and 56 respectively. Thus, wall 70 has the same diameter as wall 60. Wall 72 has the same diameter as wall 58 and wall 74 has the same diameter as wall 56. Hub 76 corresponds and opposes hub 62. Radial walls 78 do not correspond exactly to radial walls 64. That is, eleven equispaced radial walls 78 define eleven depressions 71. Intermediate radial walls 80 bisect the sector between walls 78. Note that radial slits 66 in rotor 22 have no counterpart in the stator housing 24. Rather, slits 66 are provided in the stator housing in wall 74 which is opposed to wall 60. Depressions 71, 73 and 75 of rotor 22 do not correspond identically in size and shape to depressions 51, 53, 54 of stator housing 24 though they are similar. Lack of identity promotes momentum transfer.

Since water or fluid is introduced adjacent the hub 76 of the rotor 22, fluid flow between the rotor 22 and the stator housing 24 due to momentum interaction occurs as a result of the radially outward flow of fluid from the region adjacent the hub toward the ring 38. There the fluid may be withdrawn through outlets 77 in FIG. 1 from the interior of the housing 24. Because of the pattern of the slots 61 and 66, momentum interaction is accentuated and fluid flows between the depressions of the surfaces 40, 42 to provide for torque transmission. Testing has shown that with respect to the construction of the water brake discussed above, reproducibility of results is extremely constant. Since the planar surfaces of the stator housing and rotor are substantially parallel it is easy to control the spacing thereof and thus control the operation of the water brake. Manufacturing tolerances are more easily maintained. Water brake efficiency and operation is likewise easily maintained. Thus, while there has been set forth a preferred embodiment of the invention, it is to be understood that the invention shall be limited only by the following claims and their equivalents.

What is claimed is:

1. In a water brake dynamometer of the type including a stator housing having a longitudinal axis;
   pivot mounting means for mounting the stator housing on the axis;
   a rotor mounted on a shaft in the stator housing;
   means for circulating fluid through the stator housing including means for supplying a constant volume of fluid at constant pressure to the housing; and means for sensing torque imparted from the rotor to the stator housing, the improvement of an improved fluid momentum transfer configuration for the rotor and stator housing comprising, a rotor disc having an axis of rotation coincident with the stator housing axis, said disc having planar, spaced, disc surfaces transverse to the axis, said stator including opposed surfaces parallel to and spaced from the rotor surfaces, each of said rotor surfaces and each of said stator housing surfaces having an identical surface pattern of depressions including a series of equispaced radial walls extending from the shaft, the number of radial walls on the rotor surface being distinct from the number on the stator surface; and a series of equispaced concentric walls, one concentric wall being at the outer edge of the rotor disc in opposed relation with a concentric wall in the stator surface, the remaining concentric walls of the stator disc being positioned intermediate the outer edge and the shaft and also in opposed relation with concentric walls in the stator surface; said rotor and stator surfaces including radial cuts in selected concentric walls.

2. The improvement of claim 1 including first and second concentric walls intermediate the outer concentric wall and the axis.

3. The improvement of claim 2 including additional radial walls extending from an intermittent concentric wall to the outer concentric wall, said intermittent concentric wall including radial cuts therein.

4. The improvement of claim 1 wherein said rotor has a rim defining a cylindrical edge surface with a circumferential groove in said edge surface midway between the planar surfaces of the rotor disc.

5. The improved configuration of claim 4 wherein said rim also includes spaced slots parallel to the axis and in the circumferential edge of the rotor.

6. The improved configuration of claim 1 wherein said stator housing includes a circumferential ring having an inner cylindrical surface in opposed relation to a cylindrical surface of a rim of the stator, said ring including a series of slots extending parallel to the axis and spaced circumferentially about the axis.

7. The improved configuration of claim 1 wherein said rotor surface has one less radial wall than the stator housing surface.

8. The improved configuration of claim 1 wherein one of said circumferential walls of said rotor intermediate the outer edge of the rotor and the rotor hub include radial slits and an unopposed circumferential wall of said stator surface includes radial slits.

* * * * *